(12) United States Patent
Suzuki et al.

(10) Patent No.: US 6,470,323 B1
(45) Date of Patent: *Oct. 22, 2002

(54) GOODS SALES MANAGEMENT SYSTEM

(75) Inventors: Tetsujiro Suzuki, Saitama (JP); Yuriko Kashu, Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/671,522

(22) Filed: Jun. 27, 1996

(30) Foreign Application Priority Data

Dec. 8, 1995 (JP) .............................................. 7-320510

(51) Int. Cl.⁷ .............................................. G06F 17/60
(52) U.S. Cl. .............................. 705/27; 705/1; 235/380
(58) Field of Search ................................ 705/1, 10, 14, 705/28, 27, 22, 26; 348/1; 364/401; 235/379, 380

(56) References Cited

U.S. PATENT DOCUMENTS

| | | | |
|---|---|---|---|
| 4,567,359 A | * 1/1986 | Lockwood | 235/381 |
| 4,931,932 A | * 6/1990 | Danelkoff et al. | 705/50 |
| 5,310,997 A | 5/1994 | Roach et al. | 235/375 |
| 5,313,392 A | * 5/1994 | Temma et al. | 705/27 |
| 5,649,114 A | * 7/1997 | Deaton et al. | 705/14 |
| 5,664,110 A | * 9/1997 | Green et al. | 705/26 |
| 5,687,322 A | * 11/1997 | Deaton et al. | 705/14 |
| 5,715,314 A | * 2/1998 | Payne et al. | 705/78 |
| 5,774,868 A | * 6/1998 | Cragun et al. | 705/10 |
| 5,870,716 A | * 2/1999 | Sugiyama et al. | 705/26 |
| 5,909,023 A | * 6/1999 | Ono et al. | 235/380 |
| 5,963,916 A | * 10/1999 | Kaplan | 705/26 |

FOREIGN PATENT DOCUMENTS

| | | |
|---|---|---|
| JP | 5-233663 | 9/1993 |
| JP | 5-250388 | 9/1993 |
| JP | 7-200701 | 8/1995 |
| JP | 7-210760 | 8/1995 |
| JP | 7-296075 | 11/1995 |
| WO | WO94/15294 | * 7/1994 |

OTHER PUBLICATIONS

"Firm marketing faces shift toward keeping clients" Jul. 11, 1994; Dialog file 485, Acession No. 00475147.*

* cited by examiner

Primary Examiner—Tariq R. Hafiz
Assistant Examiner—Romain Jeanty
(74) Attorney, Agent, or Firm—Staas & Halsey LLP

(57) ABSTRACT

The present invention relates to a goods sales management system which communicates directly to customers via a communication line. The system manages the transmitting of merchandising notices for the goods to selected customers based on an arrival of goods that will satisfy a previous unsatisfied customer request and based on a customer purchase history. The system includes a customer utilization history memory storing history information indicating the use of the goods sales management apparatus by customers and customer information, a customer extracting process selecting customers to whom the merchandising notices are transmitted on the basis of the utilization history information in the customer utilization history memory and a merchandising notice sending process transmitting the merchandising notices to the customers selected.

19 Claims, 13 Drawing Sheets

/21

| Name | Code | Color | Size | Amt. | Term |
|---|---|---|---|---|---|
| Skirt A | 001001 | White | M | 25 | NA |
| Skirt A | 001002 | Red | M | 0 | NA |
| Skirt A | 001003 | Black | M | 15 | NA |
| Skirt A | 001004 | Blue | M | 5 | NA |
| Rice, 3Kg | 002101 | NA | 3Kg | 50 | 1 month |
| Rice, 5Kg | 002102 | NA | 5Kg | 50 | 2 months |
| ... | ... | ... | ... | ... | ... |

| Date | ID | User | Specification Type | Specification Content |
|---|---|---|---|---|
| 950703 | 1001 | ABC | Goods | Skirt A |
| 950703 | 1001 | ABC | Color | Red |
| 950703 | 1001 | ABC | Size | M |
| 950703 | 1002 | BCD | Goods | Trousers B |
| 950703 | 1002 | BCD | Size | L |
| ... | ... | ... | ... | ... |

Figure 5

| Name | Code | Color | Size | Amt. |
|---|---|---|---|---|
| Skirt A | 001002 | Red | M | 25 |
| Skirt B | 001004 | Blue | M | 25 |
| Trousers B | 002001 | Blue | L | 30 |
| ... | ... | ... | ... | ... |

Name: Skirt A

Color: Red

Size: M

There are no goods in stock satisfying the above request conditions.

Figure 7

Name: SkirtA

Color: Red

Size: M

−Goods described above which satisfy the conditions of the request of the 3rd of July 1995 have arrived.

Figure 8

| Date | User | Name | Code |
|---|---|---|---|
| 950602 | ABC | Rice, 3Kg | 002101 |
| 950603 | BCD | Rice, 5Kg | 002102 |
| ... | ... | ... | ... |
| 950703 | ABC | Rice, 3Kg | 002101 |

| Date | User | Name | Code |
|---|---|---|---|
| 950602 | ABC | Rice, 3Kg | 002101 |
| 950703 | ABC | Rice, 3Kg | 002101 |
| 950603 | BCD | Rice, 5Kg | 002102 |
| ... | ... | ... | ... |

| Date | User | Name | Code |
|------|------|------|------|
| 950803 | ABC | Rice, 3kg | 002101 |
| 950803 | BCD | Rice, 5kg | 002102 |
| ... | ... | ... | ... |

Figure 12

3rd of August 1995

95 8 3

ABC, have the goods you previously purchased identified as Rice, 3 Kg been consumed yet?

Figure 13

GOODS SALES MANAGEMENT SYSTEM

BACKGROUND OF THE INVENTION

1. Field of the Invention

The present invention is directed to a goods sales management system for selling goods through a communication line and, more particularly, to a system that timely sends information to a customer concerning the arrival of goods previously ordered and sends a reminder to reorder goods that need to be reordered and includes sending merchandising notices with such information to customers which are familiar with purchasing of goods via access to a goods sales management apparatus or database management system or order entry system through a communication line.

2. Description of the Related Art

In the typical goods sales management system for selling goods utilizing a communication line, all the customers who are connected to the system receive the same merchandizing notices. In such systems there has been no other method or process available for sending notices other than that for sending the same message (notification), such as information about bargain sale, to all customers. Such prior art systems often send messages to customers who have recently purchased the goods of the notice. This wastes the preparation and processing time for the message of such customers and can also irritate the customers. The prior art systems also fail to notify customers that previously ordered goods, that were out of stock at the time of the previous order, have arrived and are available for ordering.

What is needed is a goods sales management system connected directly to customers through a communication line which automatically sends merchandising notices with appropriate information content to selected customers at an appropriate timing based on accumulated goods transaction information.

SUMMARY OF THE INVENTION

It is an object of the present invention to selectively send merchandising notices to customers based on goods transaction information.

It is an object of the present invention to provide a goods management system that timely notifies customers whenever previously ordered goods that were out of stock arrive.

It is another object of the present invention to provide a system that timely notifies customers when it is about time to place a new order, that is, when a previous order is likely to be reordered.

It is a further object of the present invention to selectively provide merchandising notices to customers based on system use history, purchase history, consumption or utilization history, delivery history, goods availability, goods characteristics, bargain sales, product promotions and other marketing information.

The above mentioned objects can be attained by a goods management system that includes a customer utilization history memory storing historical information indicating the use of the goods sales management system by customers as well as customer information. The system accesses the memory and selects customers to whom a merchandising notice is sent on the basis of the historical information. The system then sends the notice at an appropriate timing to the customer over the communication line. Only selected ones of the customers receive the notices.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 illustrates a data format of the contents of a goods management memory 21.

FIG. 5 depicts a data format of the contents of a retrieval history memory 23.

FIG. 6 shows a data format of goods arrival data 26.

FIG. 7 is an example of a message provided to a customer as a result of an inquiry about goods.

FIG. 8 is an example of a merchandising notice sent by the first embodiment.

FIG. 10 illustrates a data format of the contents of a purchasing history memory 24.

FIG. 11 shows a data format of the contents of the purchasing history memory 24 after a sort.

FIG. 12 depicts a data format of the contents of a transmitting list memory 25.

FIG. 13 is an example of a merchandising notice sent by the system of the present invention in the second embodiment.

DESCRIPTION OF THE PREFERRED EMBODIMENTS

Figure 1:
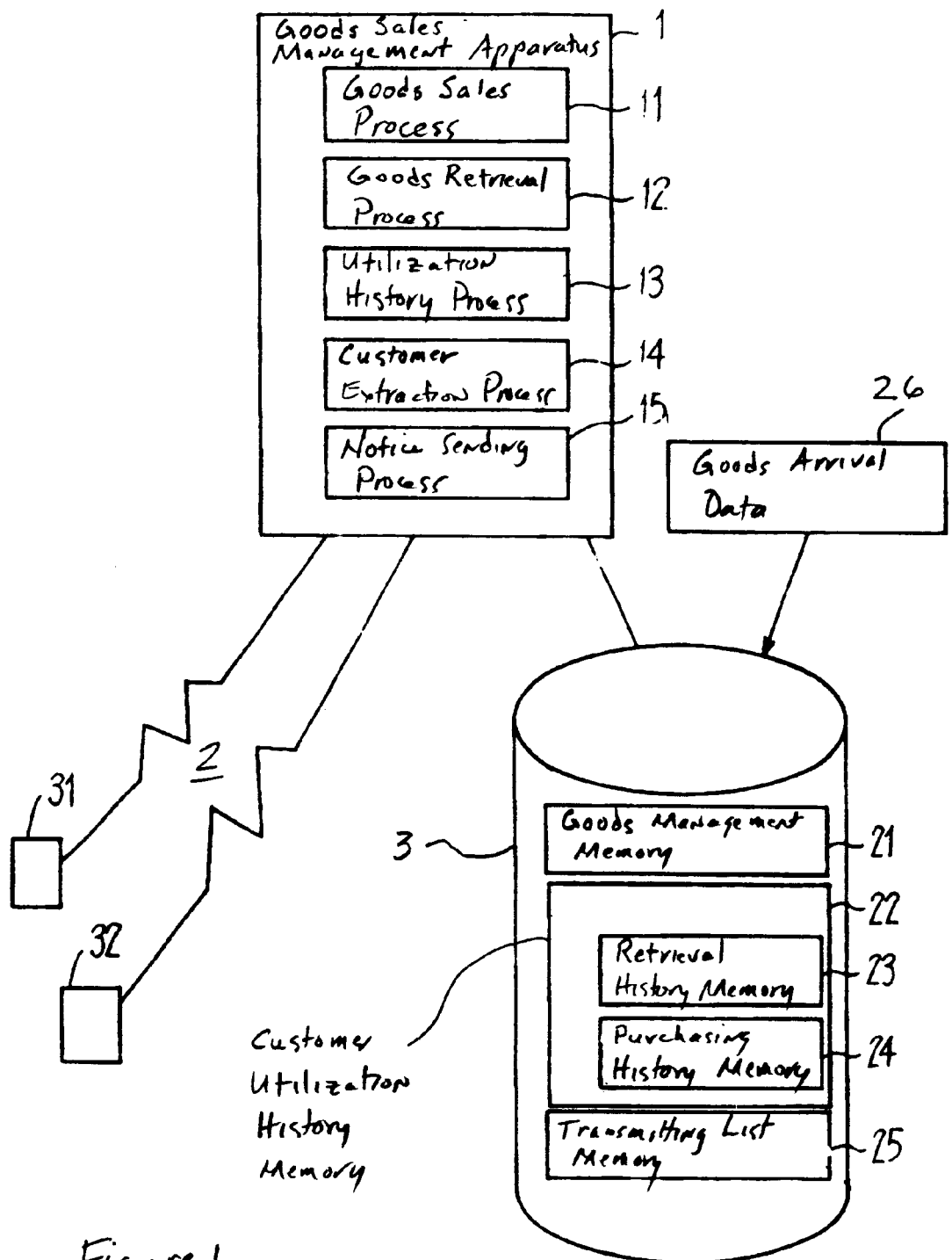
FIG. 1 is a block system diagram of the present invention.

FIG. 1 is a diagram of the system of the present invention. A goods sales management apparatus 1 which is typically a conventional central computer, including RAM, hard and floppy disk storage, such as mainframe computer or a server, but which could be a work station type computer, is coupled to plural customer processors 31 and 32. The processors 31 and 32 are connected directly to the goods sales management apparatus 1 via a conventional communications network 2. The apparatus 1 could of course be a distributed system with each process discussed herein being performed by one or more computers such as desk top type computers. The customer processors 31 and 32 (only two of which are shown for convenience of illustration) can also be mainframe computers, servers or desk top/work station type machines.

The system includes a goods sale process 11 or unit designed for selling goods via communication with the customer processors 31 and 32. A goods retrieval process 12 or unit receives a goods retrieval request (order inquiry) transmitted from the customer processors 31 and 32 and determines whether there is a stock or an inventory of goods corresponding to the request. The system also includes a utilization history process 13 or unit that processes customer/goods historical information. A customer extraction process 14 or unit is provided for extracting or selecting customers from the historical information that correspond to particular selection criteria to which to send sending the merchandising notices. A merchandising notice sending process 15 or unit formats and conventionally sends the merchandising notices to the customers selected by the customer extracting process 14.

The system also includes a database 3 that stores goods transaction information needed for tracking customer history, tracking the inventory of goods, tracking goods requests, tracking goods sales, selecting customers, preparing notices and scheduling the sending of the notices. The database 3 can store the information in database memory in form of files that include various types of data structures, such as lists, tables, etc. A sales or goods management memory 21, the contents of which will be discussed in greater detail with respect to FIG. 4, is used for storing specification type information about goods, for example, size, color, amount-in-stock (inventory), estimated period in which the goods will be consumed (or estimated purchasing interval/period).

A customer utilization history memory 22 or storage is used for storing records relating to the utilization of the goods sales management apparatus 1 by the customer processors 31 and 32. This memory is composed of a retrieval history memory 23 and a purchasing history memory 24 described briefly below.

When goods are being ordered on occasion the inventory of the desired goods is zero and the order cannot be filled or satisfied. The retrieval history memory 23 stores, after the goods retrieving process 12 has executed the retrieval process based on the goods retrieving request received from the customer processors 31 and 32, the retrieving conditions or an identification/specification of the goods requested which were not available together with a customer identifier, whenever there are no corresponding goods in stock or an insufficient stock to completely fill a customer request. The details of typical memory 23 contents will be discussed with respect to FIG. 5.

The purchasing history memory 24 stores information about the actual goods purchased through the customer processors 31 and 32 together with the customer identifiers. FIG. 10 illustrates typical contents of memory 24 and will be discussed in more detail later.

Once the system determines that a merchandizing notice should be sent to a customer the data for that notice needs to be collected and stored. A transmitting list memory 25 is used for storing the timing, customer names and content of the merchandising notice to be sent. FIG. 12 which will be discussed later shows this memory 25.

When new good arrive and are to be entered into the inventory, the data of the inventory replenishment can be reviewed to send out merchandizing notices. The goods arrival data 26 stores an identifier and a number of goods that have arrived and will be discussed with respect to FIG. 6.

The processes and databases described herein can be stored on a computer readable medium of the apparatus 1, such as a hard disk or a floppy disk, and are stored in RAM memory of the apparatus during execution.

Figure 2:
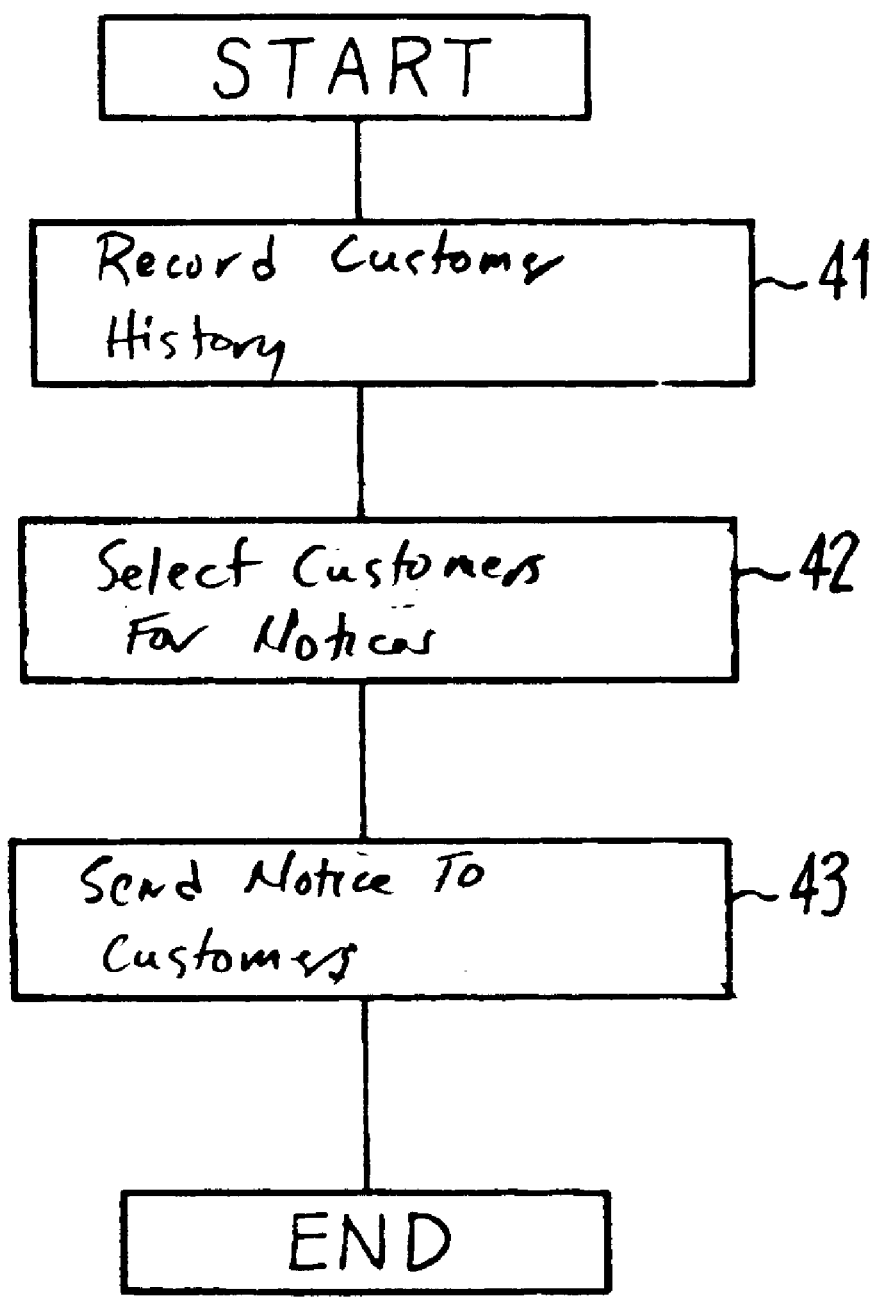
FIG. 2 is a flow chart illustrating the principles of the present invention.

FIG. 2 is a block diagram type flow chart illustrating the principles of operation of the present invention. First, history information with respect to the use of the goods sales management apparatus and the ordering of goods by customer processors 31 and 32 is stored (step 41) in the customer utilization history memory 22. Then the customer extraction process 13 retrieves or accesses the customer utilization history memory 22 to extract or select (step 42) customers to which to send the merchandising notices based on a match with the contents of merchandising notice to be sent. The merchandising notice sending process 15 then sends (step 43) the merchandising notice to the customers selected.

Figure 3:
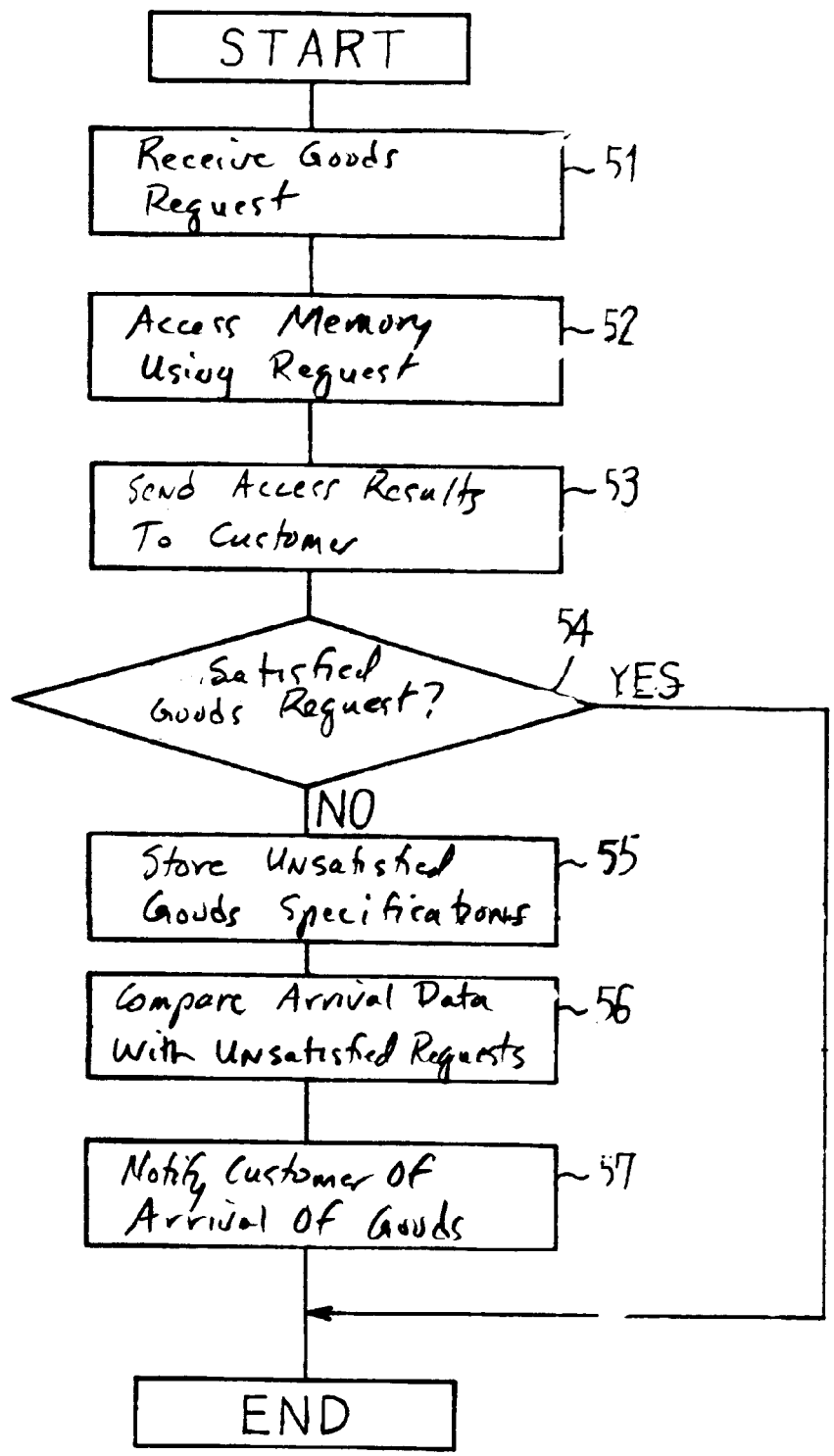
FIG. 3 is a flow chart of the process of a first embodiment of the present invention.

FIG. 3 is a flow chart of a first embodiment of the processing performed in accordance with the present invention. However, before discussing the process of FIG. 3 in detail we will discuss the various data used in the process.

FIG. 4 is a diagram illustrating a data format of the contents of the goods management memory 21 including information items providing information with respect to the goods being managed by the sales management apparatus 1. An example of such contents includes a name, type or category of the goods, an identification code for the goods, a color of the goods, a size of the goods, an amount of stock or inventory of the goods and an expected consumption period or term (or purchasing period) for the goods. For instance, the first record indicates that the goods name is "Skirt A," the goods color is "White," the goods size is "M," the goods identification code is "001001" and the current or existing stock of the goods is "25" pieces. Of course different types of goods will require different information in the memory 21 as illustrated by the last record which records an inventory for rice.

FIG. 5 is a diagram illustrating an example of a data format of the content of the retrieval history memory 23 which is a part of the customer utilization history memory 22. The data format can include the date of receipt of a retrieval request, an ID number used for identifying a group of retrieving conditions (that is, the specification definitions that identify the goods requested), user identifiers for identifying users that transmitted the retrieving request and an item specification type and its contents. As shown in FIG. 5, the ID number for identifying the retrieving conditions can indicate or identify a group of related item specifications. For instance, with respect to the ID number "1001" the records indicate that the user having the ID code "ABC" has requested retrieval of items where the name of the goods is "skirt", the color is "red" and the size is "M." Of course other information is necessary for other types of goods.

FIG. 6 is a diagram illustrating an example of a data format of goods arrival data 26. When goods arrive, goods arrival data 26, such as shown in FIG. 6, is generated or input by an input terminal or device (not illustrated) connected to the goods sales management apparatus 1 and the data in the goods management memory 21 shown in FIG. 4 is updated using such goods arrival data. For example, the first records indicates that 25 pieces of "skirt A" with the color of "red," the size of "M" and the ID code of "001002" have arrived.

FIGS. 7 and 8 show examples of messages that can be transmitted to the customer processors 31 and 32 from the goods sales management apparatus 1 where FIG. 7 illustrates an out-of-stock message and FIG. 8 illustrates an ordered-goods-arrival message.

The first embodiment of the present invention will now be explained using the flow chart of FIG. 3 and the data structures of FIGS. 4–8. The goods sales management apparatus 1 conventionally receives (step 51) a goods request including goods retrieving conditions describing the specifications of the desired goods from one or more of the customer processors 31 and 32. Next, the goods retrieving process 12 retrieves or accesses (step 52) the contents of the goods management memory 21 using the retrieving conditions to determine whether the desired goods are in stock or available. When there is a stock of the relevant or desired goods, information such as stock available, price, goods specification, etc. and the order code of the matching goods and for goods other than but similar to those of the retrieving conditions is sent (step 53) to the customer processor(s) that made the particular request. The user at the processor then can use the information to conventionally place an order to the system which is then filled. When there is no relevant goods or stock thereof, that is, when the inventory for the specified goods is zero, a message such as shown in FIG. 7 is transmitted in step 53 to the relevant ones of customer processors 31 and 32.

As a result of the above operations, the relevant goods that are available are placed within or processed by a conventional order management process (not shown) by the goods sales management apparatus 1. Once the order processing is finished for the available goods, it is judged or determined (step 54) whether there is any part of the users request that remains unsatisfied. That is, the system determines whether the request has been satisfied. If the request has not been completely satisfied the unsatisfied portion is stored (step 55). In the example discussed herein, the conditions or specifications describing goods that are not currently available are stored in the retrieval history memory 23. For instance, as shown in FIG. 7, a customer has issued a retrieval request for goods of the name "skirt A", the color "Red", the size "M", the goods retrieval process 12 accesses the contents of the goods management memory 21 of FIG. 4 to determine whether the relevant goods are available and particularly examines the second record shown in FIG. 4. However, since the stock of such goods is "0", the relevant customer processors 31 and 32 are notified that there is no stock of such goods. And as indicated in step 54, when there is no stock of such goods being managed by the apparatus 1, the conditions used for the retrieval are stored (step 55) in the retrieval history memory 24 of FIG. 5. In this example, the information stored corresponds to the first through third records shown in FIG. 5.

At some point in the future goods corresponding to the characteristics of the unfilled order will arrive and data describing the newly arrived goods will be generated and can include the information illustrated in FIG. 6. Further, another situation will arise where an unfilled request is received. When this happens the operations (steps 51–55) described above will be performed again. In this situation when the desired goods have arrived, the customer extracting process 14 compares (step 56) the goods arrival data with the data stored in the retrieval history memory 23 to determine whether the retrieving conditions for any unfilled requests match the relevant goods identified in the good arrival data 26. In this situation, not only are the retrieving conditions accessed but also user identification information is accessed. In the example of FIGS. 5 and 6, since 25 pieces of "skirt A" with the color "Red" and size "M" have arrived and desired goods of the same type are stored in the retrieval history memory 23, the user "ABC" and the corresponding goods descriptions of the match are retrieved. Then, the merchandising notice sending process 15 sends (step 57) a message to the relevant processor, such as illustrated in FIG. 8, of the customers identified by the customer extracting process 14. The system can also send a notice whenever the newly arrived goods only partially match a previously unsatisfied request. Note that the comparison of the goods arrival data to the unfilled orders data could also be done as soon as the arrival data is generated or could be done on a periodic basis rather than the next time that an unsatisfied request is identified as described above.

Figure 9:
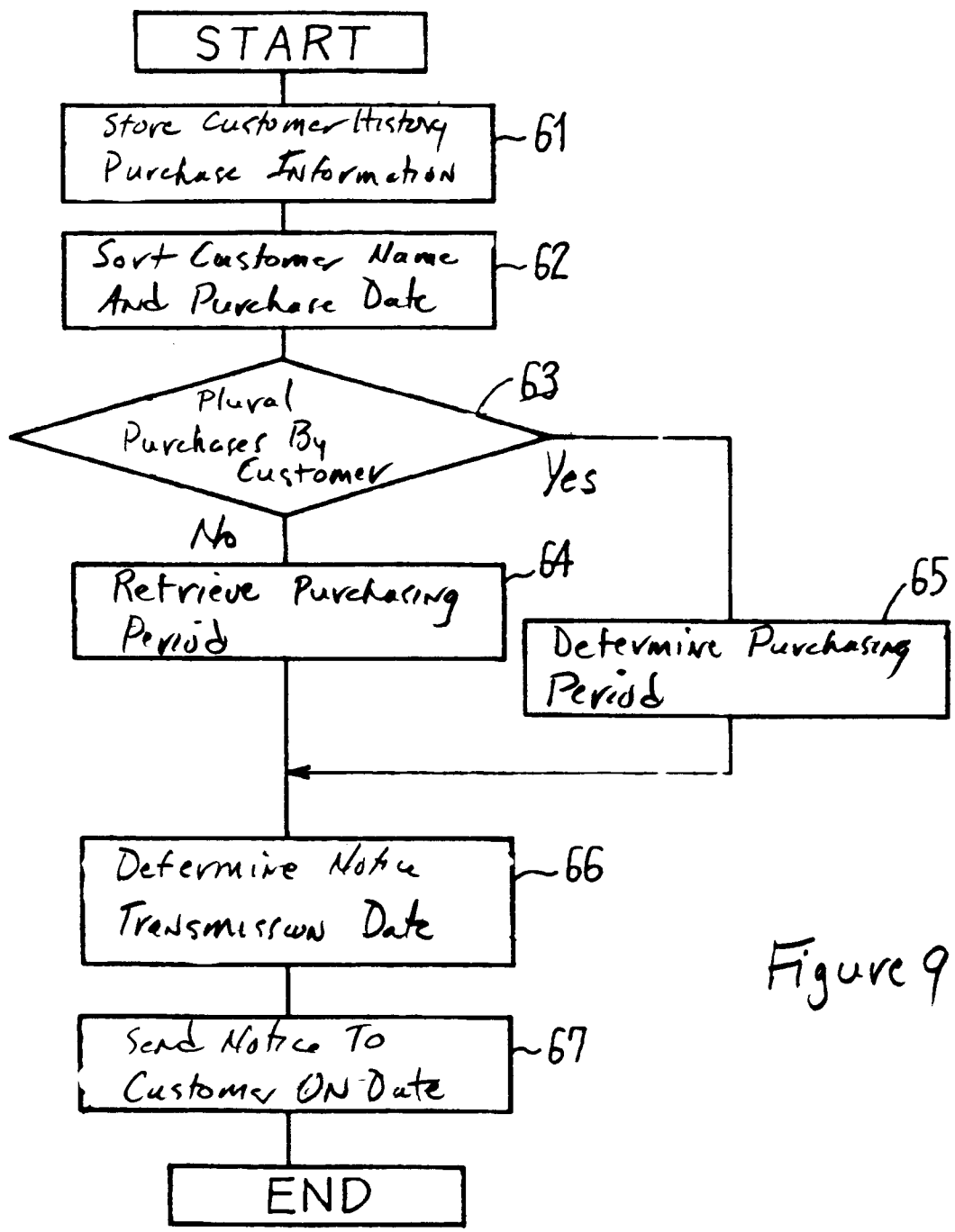
FIG. 9 is a flow chart of the process of a second embodiment of the present invention.

FIG. 9 is a flow chart of a second embodiment according to the present invention which will be discussed after the data associated with the second embodiment is described.

FIG. 10 is a diagram illustrating a data format of the purchase history memory 24 which is a part of the customer utilization history memory 21. The memory 24 stores information concerning past purchases by customers that is analyzed to determine when to send merchandizing notices to the customers. This particular data format includes the date of the purchases of goods by the customer, the customer identifier (user), a name and a code of goods purchased. For example, the first record indicates that user "ABC" purchased on the 2nd of June, 1995 rice in the 3 Kg size which has the goods code "002101."

FIG. 11 illustrates the state of the purchase history data after sort processing of the contents of the purchasing history memory 24. In the example the data has been sorted by customer and by date.

FIG. 12 is a diagram illustrating a data format of the contents of the transmitting list memory 25. This memory 25 stores a list of customers to which merchandizing messages are to be transmitted via the network 2 and to the relevant customer processors 31 and 32 by the goods sales management apparatus 1. This data format includes the customer identifier, the date the message is to be transmitted and the message contents.

FIG. 13 illustrates an example of a merchandizing message that can be transmitted to the customer processors 31 and 32 by the goods sales management apparatus 1 in the second embodiment. The message essentially tells the customer it is (approximately) the time to purchase replacement goods of a type previously purchased.

The second embodiment will now be explained using the flow chart of FIG. 9 and FIGS. 10–13 and the data of the goods management memory 21 shown in FIG. 4. The second embodiment can be combined with the first embodiment if desired.

First, the goods sales management apparatus 1 executes the goods sale process 11 to perform the appropriate goods sale processing with the customer processors 31 and 32. In this particular situation, this includes storing (step 61) the goods purchasing information, of the purchases made by customers, in the purchasing history memory 24 which is a part of the customer utilization history memory 22.

The processing which is performed in steps 62 to 67, as described below, can be periodically executed separate from the information storage process. In step 62, the customer extracting process 14 sorts the contents of the purchasing history memory 24 of FIG. 10 with the sort keys being the user and the purchasing date which produces the sorted data of FIG. 11. In FIG. 10, a user "ABC" has a purchasing history as depicted by the first and fourth records, while in FIG. 11 which shows contents of the purchasing history memory 24 after the sorting, the purchasing history of customer "ABC" is stored in the first and second records in the order of the purchasing date.

Next, it is judged or determined (step 63) whether the same user has purchased the same goods for a plurality of times. In this example, (see FIG. 11) the user "ABC" has purchased "Rice, 3 Kg" (which is the name of the goods) two times on the "2nd of June, 1995" and on the "3rd of July, 1995." During this period a user "BCD" has purchased "Rice, 5 Kg" on the "3rd of June, 1995." When purchases have been made for a number of times, as in the case of user "ABC", a mean interval of the purchasing dates (a consumption period) is obtained or calculated and can be used to determine (step 65) when merchandizing notices are to be sent to the corresponding customer. In above example of customer "ABC," a purchasing period or consumption period of one month is determined. When the customer does not have a history of purchases, such as a single purchase like that of user "BCD", the consuming period of the relevant goods stored in the goods management memory 21 of FIG. 4 is used (step 64). In the case of consumer "BCD" where only a single purchase has been made, as illustrated in the goods management memory 21 of FIG. 4, the consuming period corresponding to "Rice, 5 Kg" with the goods code "0021023" is obtained from the memory 21 as 2 (two) months.

Next, the date for transmitting the merchandising notice is determined (step 66) on the basis of the computed or retrieved consumption period and the most recent purchase date. Then, the customer identifier, notice transmission date and contents of the merchandizing message are stored in the transmitting list memory 25.

Responsive to the contents of the transmitting list memory 25, the merchandising notice sending process 15 executes (step 67) transmission processing on the specified day. An example of the message or notice to be transmitted to the customer processors 31 and 32 is shown in FIG. 13, where the first line is the entry for the date, the second line is the entry for the name of the customer and the fourth line is for the entry of name of goods which contents are inserted responsive to the contents of the transmitting list memory 25.

The present invention as discussed in detail above selects the customers that satisfy the conditions for transmitting a merchandising notice to them by referring to a utilization history of respective users, thereby eliminating unnecessary and ineffective transmissions of merchandising notice by the goods sales management apparatus 1. Moreover, since only reasonable merchandising notices are transmitted, the customer receiving such merchandising notices can reduce the use of procedures used for selecting only needed information from among the various pieces of information that are received by a customer. Moreover, since only relevant and timely information is transmitted to customers, the probability that the merchandising notice is read by the customer is higher which has a high degree of merit in operation of the goods sales management apparatus of the present invention.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A goods sales management apparatus for realizing goods sales management through communication lines, comprising:

customer utilization history memory means for storing utilization history information and customer information, the utilization history information including information indicating a request transaction carried out by a customer using said goods sales management apparatus over a communication line;

customer extraction means for selecting customers to whom a merchandising notice for promoting a purchase of the goods is to be sent based on the utilization history information of said customer utilization history memory means; and merchandising notice sending means for sending the merchandising notice to the selected customers over corresponding communication lines which are not under the control of said goods sales management apparatus, when a purchasing period, based on a purchase history for each customer, has elapsed, said purchasing period being based on the last date the goods were purchased and a consumption period of those goods.

2. A goods sales management apparatus, comprising:

customer utilization history memory means for storing utilization history information of a use of the goods sales management apparatus by customers and customer information:

customer extraction means for selecting customers to whom a merchandising notice for promoting a purchase of the goods is to be sent based on the utilization history information of said customer utilization history memory means;

merchandising notice sending means for sending the merchandising notice to the selected customers over corresponding communication lines which are not under the control of said goods sales management apparatus, when a purchasing period, based on a purchase history for each customer, has elapsed;

goods selling means for executing processes for selling goods and storing sales information; and a goods management memory storing a goods identifier and a consuming period of sold goods; and wherein:

said customer utilization history memory means stores, from said goods selling means, the identifiers of goods purchased by the customers, purchase dates and customer identification information;

said customer extracting means selects customers for whom a period up to the current date from purchasing date stored in said customer utilization history memory means has exceeded a period longer than the consuming period determined by accessing said goods management memory using the goods identifier of said customer utilization history memory means as a key; and said merchandising notice sending means sends a merchandising notice for promoting purchase of goods to the customers extracted by said customer extracting means.

3. A goods sales management apparatus, comprising:

customer utilization history memory means for storing utilization history information of a use of the goods sales management apparatus by customers and customer information;

customer extraction means for selecting customers to whom a merchandising notice for promoting a purchase of the goods is to be sent based on the utilization history information of said customer utilization history memory means;

merchandising notice sending means for sending the merchandising notice when a purchasing period, based on a purchase history for each customer, has elapsed;

goods selling means for executing processes for selling goods and storing sales information; and a goods management memory for storing a goods identifier and a consuming period of said goods; and wherein;

said customer utilization history memory means stores, from said goods selling means, the identifiers of goods purchased by customers, purchase dates and customer identification information;

said customer extracting means determines, when the customer utilization history memory means records that a customer has purchased the same goods for several times, a purchasing period of said goods and selects customers for whom the period up to the current date from a latest purchasing date stored in said customer utilization history memory means has exceeded the purchasing period; and said merchandising notice sending means sends a merchandising notice for promoting purchase of goods to the customers selected by said customer extracting means over corresponding communication lines which are not under the control of said goods sales management apparatus.

4. A goods management notification process, comprising:

storing a purchase history of goods for customers;

establishing a purchasing period for the goods from the purchase history for each of the customers;

determining when the purchasing period has elapsed since a latest purchase for each customer; and notifying the customers via a global computer network when the purchasing period has elapsed, the purchasing period comprising a predetermined expected consumption period when the customer has only made a single purchase.

5. A process as recited in claim 4, wherein said establishing sorts customer history responsive to customer name and purchasing date and calculates a mean of the purchasing dates as the purchasing period.

6. A process as recited in claim 4, wherein said determining determines when the purchasing period will expire and said notifying notifies the customers of a pending elapse.

7. A goods management system, comprising:

a storage storing goods transactions information including information indicating a request transaction carried out by a customer using said goods management system through a computer network which is not under the control of said goods management system;

a computer coupled to said storage and preparing merchandising notices for selected ones of customers responsive to the goods transactions information: and a unit sending the merchandising notices to the selected customers through the computer network which is not under the control of said goods management system when a purchasing period has elapsed, the purchasing period comprising a predetermined expected consumption period when one of the selected customers has previously purchased goods.

8. A goods management process, comprising:

storing goods transactions information including information indicating a request transaction carried out by a customer through a global computer network;

preparing merchandising notices for selected ones of customers responsive to the goods transactions information; and sending the merchandising notices to the selected customers through the global computer network when a purchasing period has elapsed, the purchasing period comprising a predetermined expected consumption period when one of the selected customers has previously purchased goods.

9. A goods management process, comprising:

storing goods transaction information including information indicating one or more of a request transaction and a purchase carried out by a customer through a global computer network;

preparing product information notices for selected ones of customers based on the goods transaction information; and sending the product information notices to the selected customers through the global computer network, wherein when the goods transaction information is a purchase, one of the product information notices is sent based on a predetermined expected consumption period of the goods which were purchased.

10. A goods management process, comprising;

storing goods access information including information indicating that a customer has accessed information relating to a specified product through a global computer network;

preparing product information notices for selected ones of customers based on the stored goods access information; and sending the product information notices to the selected customers through the global computer network, wherein the product information notices remind a selected customer that a product previously purchased by the customer has likely been consumed by the customer.

11. A goods management process as recited in claim 10, wherein the stored goods access information includes goods transaction information including information indicating one or more of a request transaction and a purchase carried out by the customer through the global computer network.

12. A goods management process as recited in claim 10, wherein said preparing includes preparing product information notices about new products related to the stored goods access information.

13. A goods management process according to claim 10, wherein the product information notices include electronic discount coupons.

14. A goods management process according to claim 10, wherein the product information notices include e-mail messages notifying the selected customers of the availability of selected products based on the stored goods access information.

15. A goods management process according to claim 10, wherein the product information notices are e-mail messages.

16. A computer readable storage controlling a computer and comprising a process of:

storing goods access information including information indicating that a customer has accessed information relating to a specified product through a global computer network;

preparing product information notices for selected ones of customers based on the stored goods access information; and sending the product information notices to the selected customers through the global computer network, wherein the product information notices remind a selected customer that a product previously purchased by the customer has likely been consumed by the customer.

17. A goods management system comprising:

a storage storing goods access information including information indicating that a customer has accessed information relating to a specified product through a computer network which is not under the control of said goods management system;

a computer coupled to said storage and preparing product information notices for selected ones of customers based on the stored goods access information; and a transmission unit sending the product information notices to the selected customers through the computer network, which is not under the control of said goods management system wherein the product information notices remind a selected customer that a product previously purchased by the customer has likely been consumed by the customer.

18. A computer readable storage controlling a computer and comprising a process of:

storing goods transaction information including information indicating one or more of a request transaction and a purchase carried out by a customer through a global computer network;

preparing product information notices for selected ones of customers based on the goods transaction information; and sending the product information notices to the selected customers through the global computer network, wherein the product information notices remind a selected customer that a product previously purchased by the customer has likely been consumed by the customer.

19. A goods management system comprising:

a storage storing goods transaction information including information indicating one or more of a request transaction and a purchase carried out by a customer through a global computer network;

a computer coupled to said storage and preparing product information notices for selected ones of customers based on the goods transaction information; and a transmission unit sending the product information notices to the selected customers through the global computer network, wherein the product information notices remind a selected customer that a product previously purchased by the customer has likely been consumed by the customer.

* * * * *